(12) United States Patent
Eggers et al.

(10) Patent No.: US 6,768,127 B1
(45) Date of Patent: Jul. 27, 2004

(54) DEVICE AND METHOD FOR WAVELENGTH DEPENDENT LIGHT OUTCOUPLING

(75) Inventors: Stefan Eggers, Wentorf (DE); Claas Andreae, Brietlingen (DE)

(73) Assignees: Basys Print GmbH Systeme fuer Druckindustrie, Boizenburg (DE); Toyo Ink. Mfg. Co., Ltd., Tokyo (JP)

( * ) Notice: Subject to any disclaimer, the term of this patent is extended or adjusted under 35 U.S.C. 154(b) by 23 days.

(21) Appl. No.: 10/088,311

(22) PCT Filed: Aug. 11, 2000

(86) PCT No.: PCT/EP00/07841

§ 371 (c)(1),
(2), (4) Date: Jun. 4, 2002

(87) PCT Pub. No.: WO01/22168

PCT Pub. Date: Mar. 29, 2001

(30) Foreign Application Priority Data

Sep. 17, 1999 (DE) .......................................... 199 44 761

(51) Int. Cl.[7] .......................... A61N 5/06; G03B 13/26; G03B 27/54
(52) U.S. Cl. ........................ 250/504 R; 355/44; 355/45; 355/67
(58) Field of Search ..................... 250/504 R; 355/44, 355/45, 67, 30, 53

(56) References Cited

U.S. PATENT DOCUMENTS

| 4,095,881 A | * | 6/1978 | Maddox | ........................ 355/30 |
| 5,537,168 A | * | 7/1996 | Kitagishi et al. | ............ 353/101 |
| 5,726,739 A | * | 3/1998 | Hayata | ......................... 355/67 |

FOREIGN PATENT DOCUMENTS

WO          98/08081         2/1998

* cited by examiner

*Primary Examiner*—John R. Lee
*Assistant Examiner*—Paul M. Gurzo
(74) *Attorney, Agent, or Firm*—Michael J. Striker

(57) ABSTRACT

The invention relates to an exposure apparatus, in particular for wavelength-dependent light outcoupling, in which at least one preferably wavelength-dependent mirror layer is located within an exposure beam path of a lamp, which mirror layer is used to divide the beam path into a spectral portion used for exposure, and into an unused spectral portion. The object of the invention is to provide an exposure apparatus and a method with which the quality of exposure can be optimized using simple means. The object on which the invention is based is attained according to the invention by locating a mirror in the beam path of the unused region of the spectrum that reflects the unused spectral range in the direction of a mirror layer, and a portion of this is projected onto a viewing screen for adjustment purposes.

5 Claims, 2 Drawing Sheets

DEVICE AND METHOD FOR WAVELENGTH DEPENDENT LIGHT OUTCOUPLING

BACKGROUND OF THE INVENTION

The present invention relates to an exposure apparatus comprising a lamp and a condensor device, in particular for wavelength-dependent light outcoupling, whereby a first, wavelength-dependent mirror layer is located with in the exposure beam path to divide the beam path into a first, UV portion for exposure, and into a second, primarily visible and/or IR special portion, whereby a second mirror is located in the beam path of the second spectral portion that reflects the second spectral portion back to the first mirror layer.

Such an exposure apparatus for photocopiers is made known in U.S. Pat. No. 4,095,881. The light from a halogen lamp strikes a curved reflector, from which point a parallel bundle of rays is partially reflected by an inference filter located in front of the lamp in the beam path, and its IR portion is allowed to pass through. The IR portion is reflected back into the lamp via a mirror, in order to warm it up and thereby save electrical energy to operate the lamp.

An exposure method is made know in JP-A-3022518 in which a wavelength selective mirror layer that divides the beam path into a spectral portion used for exposure and into a further spectral portion is penetrated by radiation within the exposure beam path of the lamp. Under normal circumstances, the further spectral portion is focussed on the end of a bundle of light guides that is connected to a device for controlling the correct focussing. The disadvantage of this method is the fact that the entire spectral portion not used for exposure causes the instrument parts radiated by it to heat up considerably. This can lead to the maladjustment or even destruction of the instrument parts.

The object of the invention is to present an exposure apparatus and a method with which exposure quality can be optimized using simple means.

This object is attained by means of the invention by the fact that a viewing screen is located in the beam path of the light portion of the second spectral portion reflected on the first mirror layer before the second pass through this first mirror layer, and by the fact that imaging optics are located between the viewing screen and the first mirror layer to image the lamp on the viewing screen.

Light is outcoupled in wavelength-dependent fashion using the first, preferably wavelength-dependent mirror layer. The light emitted from the lamp is thereby divided into a UV portion used for exposure, and into an unused, visible and IR spectral portion. The used, UV spectral portion is diverted in the direction toward the lens, while the visible and the IR portion pass through the mirror layer. By optimizing the mirror layer, reflection coefficients of nearly R=100% and transmission coefficients of T=90% can be achieved. By employing a plurality of such units, a suppression of greater than 1:1000 can be achieved with a utilized light efficiency of approximately 98%. Due to light outcoupling, the UV portion is practically all that reaches the offset printing plate for exposure. The energy in the undesired spectral range that is received is very low. No unnecessary heating up—or the negative consequences related therewith—takes place.

The first visible and IR spectral portion which is not used for exposure and passes through the first, preferably wavelength-dependent mirror layer is reflected on the second mirror located, in particular, perpendicular to the propagation of the unused spectral portion, back in the direction of the first mirror layer. Exacty like the first pass, this second passage through the first, preferably wavelength-dependent mirror layer is not complete, either, because residual reflection remains. A portion, A=T*(1-T), is reflected on the mirror layer and diverted in a direction away from the object to a viewing screen, on which an image of the lamp is then created by means of imaging optics. This image is used to adjust the lamp. This allows for a much more effective positioning of the lamp than could be achieved using an unadjusted installation, due to the mechanical tolerances of lamps. The result is a much more accurate illumination of the object to be illuminated. Appropriate reference marks can be applied on the viewing screen to simplify the adjustment process.

The largest share of the second spectral portion—which is not used for exposure—passes through the mirror layer back in the direction of the lamp, i.e., it does not reach the offset printing plate. The radiant energy can be absorbed here by lamp cooling elements already in place. No further elements are needed to absorb the portion not used for exposure. As a result, the entire apparatus can be designed to be more compact and, in particular, more cost-effective.

An image of the lamp, the lamp filament, or the lamp electrodes is created on the viewing screen. The exposure apparatus can now be adjusted effectively using this image. The viewing screen preferable comprises a ground-glass screen, on which a mirror-inverted image of the lamp is projected. This simple exemplary embodiment of the viewing screen is cost-effective to manufacture and relates the position of the light source as an image with sufficient accuracy.

Imaging optics for imaging the lamp on the viewing screen are located between the viewing screen and the first, preferably wavelength-dependent mirror layer so that an image of the lamp can be displayed on the viewing screen. These imaging optics comprise a lens system, for example. The advantage of a lens system is the high light intensity and good accuracy. By arranging the lenses appropriately, it is possible to create an enlarged representation of the lamp, which is conducive to a rapid and simplified adjustment of the exposure apparatus. A simple aperture plate can be used in order to reduce assembly. According to the principle of a "hidden camera", this produces a mirror-inverted image of the lamp on the viewing screen, which is designed as a ground-glass screen, for instance.

According to a further advantageous exemplary embodiment of the invention, the imaging and reflecting functions of the imaging optics and the mirror can be combined in one component if the second mirror is designed curved in shape. This design saves costs, because a complicated and cost-intensive lens system between the mirror wall and viewing screen can be eliminated.

The exposure apparatus can be further improved if a reflector is located in the beam path behind the lamp. It creates a reversed image of the lamp in or, preferably, next to the lamp. The light yield can be nearly doubled as a result. Additionally, adjustment can be greatly simplified, because it can now be carried out with the images of the lamp and the lamp image positioned side-by-side on the viewing screen.

The arrangement of the individual components is extremely important to achieve a particulary space-saving and efficient design of the apparatus. For example, a condenser and the semipermeable mirror layer are located in the beam path behind the lamp in the ray direction. The semipermeable mirror layer divides the light into a first, preferably, UV portion used for exposure, and into a second spectral portion, preferably the visible and IR portion. A mirror is located in linear succession after the second spectral portion, which mirror reflects the second spectral portion back in the direction toward the semipermeable mirror layer, which is situated so as to divert part of the second spectral portion to the viewing screen. In this fashion, all functions are realized in a very compact design. The light reflected back into the lamp and not used for exposure is absorbed there by cooling elements. Parts of this second spectral portion serve to adjust the lamp with the aid of the viewing screen. The fact that only the used, preferably UV portion reaches the offset printing plate is particularly advantageous.

The object of the method is attained using an exposure metohod for wavelength dependent light outcoupling according to the invention, in which at least a first, wavelength-dependent mirror layer is penetrated by radiation within an exposure beam path of a lamp to divide the beam path into a first spectral portion used for exposure, and into a second spectral portion, wherein at least one part of the second spectral portion is used to adjust the lamp, wherein the second spectral portion is reflected on a second mirror back in the direction toward the first mirror layer, and wherein the light portion reflected in the second pass through the first mirror layer is imaged on the viewing screen.

A particularly advantageous aspect of the method is the fact that the lamp can be easily adjusted by means of the image created, and the largest share of the visible light and, mainly, the IR radiation can be kept away from the adjusting device. The largest share of the second spectal portion passes through the mirror layer in the second pass through the preferably wavelength-dependent mirror layer in the direction of the lamp, where the energy is advantageously absorbed by cooling elements already in place. No further cooling elements are necessary, therefore, which allows for a more compact and cost-effective design.

The method according to the invention is carried out particularly advantageously, by the fact that the light emitted by a lamp is bundled with the aid of a condensor and, by means of a first, semipermeable, preferably wavelength-dependent mirror layer, is divided into a special portion used for exposure and into a second spectral portion, whereby the second spectral portion penetrates the mirror layer and is reflected back by a second mirror in the direction toward the first mirror layer and is partially diverted on the mirror layer in the direction toward the viewing screen, and an image of the lamp is created on the viewing screen. This image can be used to adjust the lamp. This advantageous exemplary embodiment of the method allows for a very compact design of the device.

This is described in greater detail using the drawings, which represent an exemplary embodiment of the invention.

DESCRIPTION OF THE PREFERRED EMBODIMENTS

Figure 1:
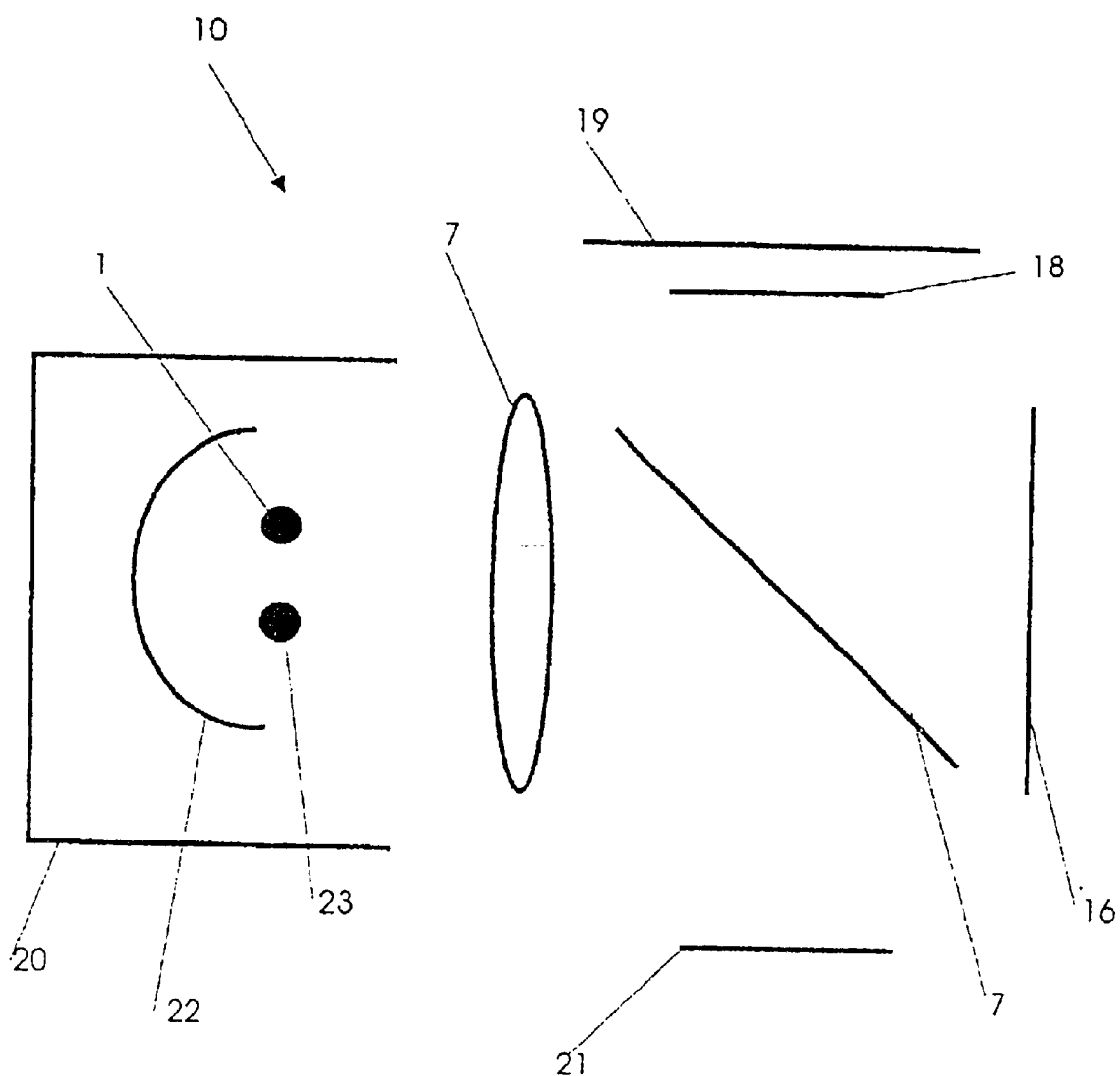
FIG. 1 shows a schematic representation of the device according to the invention, and the method.

An exposure apparatus 10 is shown in FIG. 1. A condensor 2 is located in the beam path of the lamp 1, onto which the divergent bundle of rays emitted by the lamp 1 falls and leaves this as a parallel bundle of rays. The parallel bundle of rays radiates in the direction toward a semipermeable mirror layer 7 located in the further course of the beam path. This semipermeable mirror layer 7 divides the light beams into a first UV portion 14 used for exposure, and into a second, visible and IR portion 15. The second spectral portion 15 passes through this wavelength-dependent mirror layer 7 and, in linear succession after it, hits a second mirror 16 which reflects the second spectral portion back to the mirror layer 7, which is positioned at a 45-degree angle to the beam path of the second spectral portion 15. Part of this second spectral portion 17 is now reflected at a 90° angle, passes through imaging optics 18, and hits a viewing screen 19. The used spectral portion 14 is diverted by the mirror layer 7 directly in the direction of the object 21 or before by means of further mirror layers. A reflector 22 is located on the side of the lamp 1 opposite to the condensor 2, which reflector 22 creates a reversed image 23 of the lamp in or, preferably, next to the lamp 1. The light yield can be nearly doubled as a result. Additionally, adjustment can be greatly simplified, because it can now be carried out with the images of the lamp and the lamp image positioned side-by-side on the viewing screen 19. The radiant energy of the unused spectral portion is absorbed by lamp cooling elements 20. No further light-absorbing elements are required.

Figure 2:
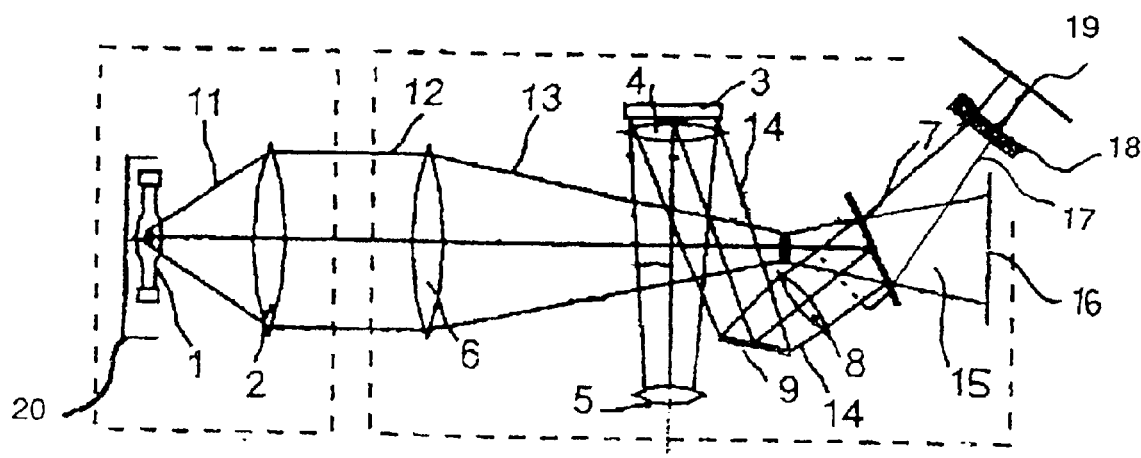
FIG. 2 shows a schematic representation of the beam path in an exposure apparatus for printing plates using a digital mirror device.

FIG. 2 shows the beam path in an exposure apparatus for printing plates using a digital mirror device 3. The drawing shows an exposure apparatus 10 comprising a lamp 1, a condensor device 2, a light modulator designed as digital mirror device 3, a field lens 4 located directly in front of the digital mirror device 3, and a projection lens 5. Also located in the beam path after the condensor 2 is a large converging lens 6, a first wavelength-dependent mirror layer 7, a converging lens having a smaller diameter, and a plane mirror 9. A second mirror 16 is located behind the wavelength-dependent mirror layer 7, which second mirror 16 can be designed parabolic in shape, for example, depending on the exemplary embodiment. Imaging optics and a viewing screen are positioned at an angle above this.

A divergent bundle of rays 11 leaves a lamp 1 and falls upon the condenser device, then exits it as a parallel bundle of rays 12. The parallel bundle of rays 12 strikes the large converging lens 6, which forms a convergent bundle of rays out of this, which convergent bundle of rays achieves its smallest cross-section in front of the converging lens 8. The wavelength-dependent mirror layer 7 divides the bundle of rays 13 into a first UV portion 14 and a second visible and IR portion 15. The UV portion 14 is reflected downward at an angle by the wavelength-dependent mirror layer 7 and reaches the converging lens 8. Before the small converging lens 8, the UV portion 14 is reflected further on the plane mirror 9 and continues upward at an angle, where it strikes the field lens 4. A parallel bundle of rays—not described further—passes through the field lens 4 and strikes the digital mirror device 3, where it is reflected at an acute angle and passes back through the field lens 4. The field lens 4 forms a convergent bundle of rays out of the reflected rays, which convergent bundle of rays travels downward normally into the projection lens 5.

The second, visible and IR portion 15 passes through the wavelength-dependent mirror layer 7 and, in linear succession after it, strikes a second mirror 16, which reflects the second spectral portion 15 back toward the wavelength-dependent mirror layer. A part 17 of this second spectral portion—passing through imaging optics 18—is now reflected on a viewing screen 19, by way of which the lamp 1 can be adjusted. The largest share of the second spectral portion passes back through the first mirror layer and returns to the lamp 1, where it is absorbed by cooling elements 20.

Reference Numerals

1: Lamp
2: Condensor
3: Digital mirror device
4: Field lens
5: Projection lens
6: Large converging lens
7: Wavelength-dependent mirror layer
8: Converging lens
9: Plane mirror
10: Exposure apparatus
11: Divergent bundle of rays
12: Parallel bundle of rays
13: Convergent bundle of rays
14: UV spectral portion
15: Second spectral portion
16: Second mirror
17: Reflected part of the second spectral portion
18: Imaging optics
19: Viewing screen
20: Cooling elements
21: Object
22: Reflector
23: Image of the lamp

What is claimed is:

1. An exposure apparatus, comprising a lamp; a condenser device; a first wavelength-dependent mirror layer located within an exposure beam path of said lamp to divide the beam path into a first UV portion used for exposure, and into a second spectral portion selected from the group consisting of a visible portion, an IR spectral portion, and both; a second mirror located in the beam path of a second spectral portion that reflects the second spectral portion back to said first mirror layer; a viewing screen located in the beam path of a light portion of said second spectral portion before a second pass through said first mirror layer; an imaging optics located between said viewing screen and said first mirror layer to image said lamp on said viewing screen.

2. A device as defined in claim 1, wherein said second mirror has a curved shape.

3. A method for adjusting a lamp of an exposure apparatus, comprising the steps of penetrating at least one first mirror layer by radiation within an exposure beam path of a lamp to divide the beam path into a first spectral portion used for exposure and into a second spectral portion; using at least one part of the second spectral portion to adjust the lamp; reflecting the second spectral portion on a second mirror back in direction toward the first mirror layer; and imaging the light portion reflected in a second pass through the first mirror layer, on a viewing screen.

4. The method as defined in claim 3; and further comprising absorbing a largest share of the second spectral portion in cooling elements in a lamp housing.

5. The method as defined in claim 3; and further comprising bundling a light emitted by the lamp with a condenser; and dividing the bundled light into the first spectral portion used for exposure and into the second spectral portion by the first mirror layer which is wavelength-dependent, so that the second spectral portion penetrates the mirror layer, and reflected by the second mirror back in direction toward the first mirror layer, and is partially diverted on the mirror layer in direction toward the viewing screen, so that an image of the lamp is produced.

* * * * *